Nov. 22, 1949     L. LEPAGE ET AL     2,488,632
MECHANICAL INNER TUBE

Filed Oct. 5, 1946     2 Sheets-Sheet 1

Inventors:
Lucien Lepage
Joseph A. De Champlain
per J. B. Côté
Attorney

Nov. 22, 1949
L. LEPAGE ET AL
2,488,632
MECHANICAL INNER TUBE
Filed Oct. 5, 1946
2 Sheets-Sheet 2
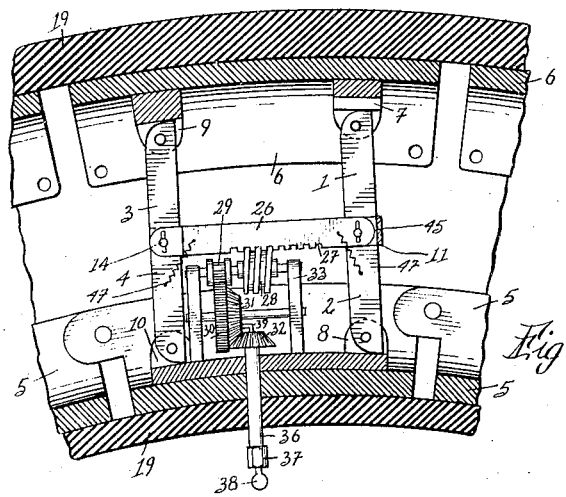
Fig:6
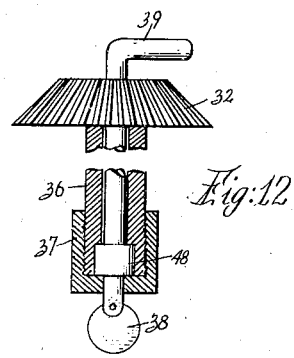
Fig:12
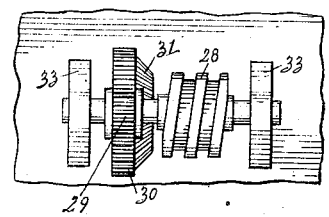
Fig:7
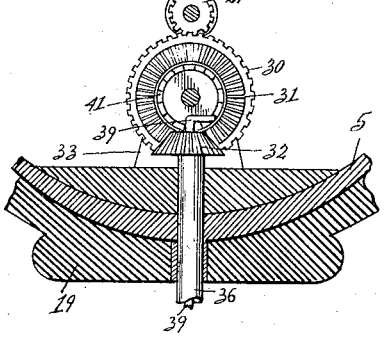
Fig:9
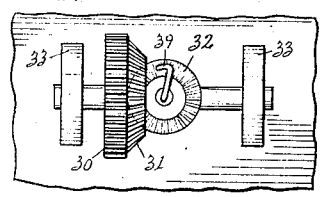
Fig:8
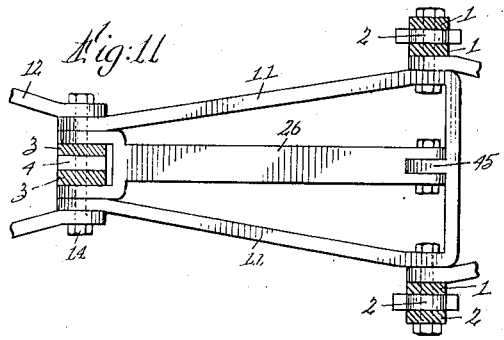
Fig:11
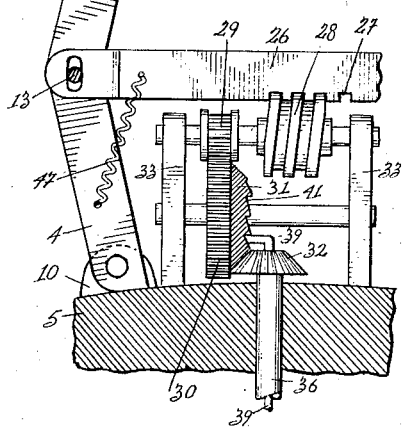
Fig:10
Inventors:
Lucien Lepage
Joseph A. De Champlain
per J. B. Coté
Attorney Patented Nov. 22, 1949

2,488,632

UNITED STATES PATENT OFFICE 2,488,632

MECHANICAL INNER TUBE

Lucien Lepage, Rimouski, Quebec, and Joseph A. De Champlain, Quebec, Quebec, Canada Application October 5, 1946, Serial No. 701,496
In Canada June 7, 1946

7 Claims. (Cl. 152—312)

The invention relates to mechanical inner tubes, and particularly to a device of this character for adapting such implement for replacing pneumatic tubes, or air chambers in automobile tire casings.

An object of the invention resides in providing a mechanical inner tube that will be puncture proof, thus affording greater security to automobile travel, against accidents due to blowouts.

Another object of the invention resides in providing a mechanical inner tube adaptable to all kinds of tire casings and for replacing all kinds of pneumatic tubes.

Another object of the invention resides in providing a mechanical inner tube that will not become hot and distended when rotating at high speed, or when operating under a hot sun.

Another object of the invention resides in providing a mechanical inner tube having durable qualities and capable of giving longer service than the pneumatic tube.

Another object of the invention resides in providing an all metallic inner tube, made of light metal, or light alloy, flexible, light, elastic and resistant.

Another object of the invention resides in providing a mechanical inner tube having a plurality of soles arranged in successive articulated relation so as to form a complete circular shoe and having sufficient elasticity for supporting equally well, low and high speeds.

Another object of the invention resides in providing a mechanical inner tube having means of expansion for obtaining the necessary rigidity in the tire casing for adequate service at all speeds.

The invention includes other objects and improvements in the construction and arrangement of the parts for carrying out the purposes for which it is intended and which are more particularly described in the following description directed to be the preferred form of the invention, it being understood however, that variations may be made in the form, construction and arrangement of these parts without departing from the spirit and scope of the invention, as described and claimed.

In the drawing forming part of this application:

Figure 6 is a section taken lengthwise of the tire casing illustrated in Figure 1, and showing the device whereby the mechanical inner tube may be dilatated.

Figure 7 is an enlarged view of a worm gear with square thread, and of toothed gears, these being details of the mechanism illustrated in Figure 6.

Figure 8 is an enlarged view of the mechanism illustrated in Figure 6, the worm gear being removed.

Figure 9 is a detail view, partly sectional, of the mechanism illustrated in Figure 6.

Figure 10 is a detail, enlarged view of the device illustrated in Figure 6.

Figure 11 is a link of the endless chain illustrated in Figure 2 and showing a rocker arm for connecting to the toggle joints illustrated in Figure 6.

Figure 12 is a sectional, enlarged and detailed view of the mechanism whereby the device illustrated in Figure 6 is operated.

In the following description, similar numerals refer to similar parts throughout.

Figure 1:
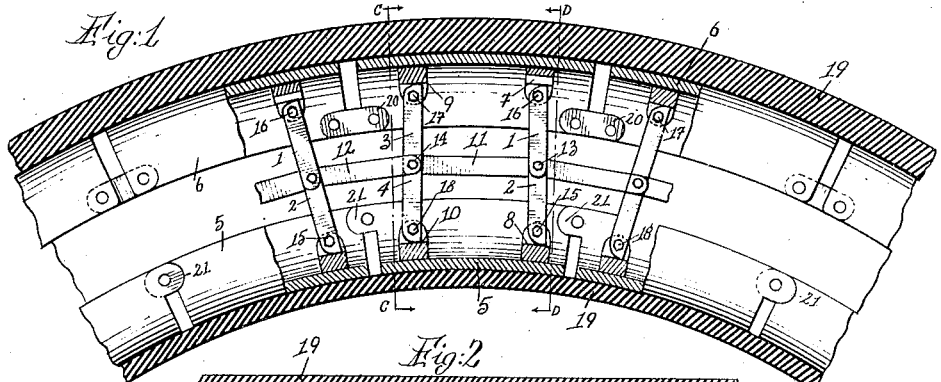
Figure 1 is a section taken lengthwise of an ordinary tire casing equipped with our mechanical inner tube. The line B—B on Figure 3 shows an exact delineation of this cut.
Figure 2:
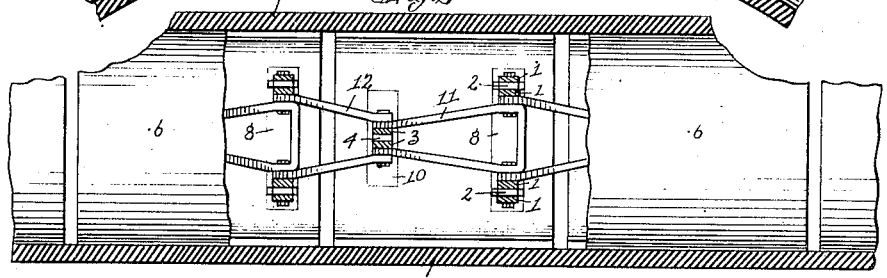
Figure 2 is a section taken lengthwise of the casing illustrated partly in Figure 1, but the section is taken perpendicularly to that shown in Figure 1; it is more exactly delineated by the line A—A, Figure 3.
Figure 3:
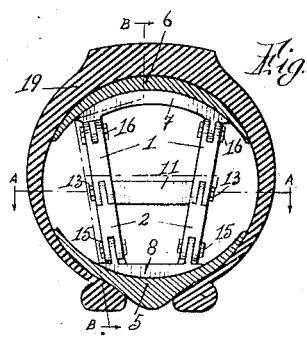
Figure 3 is a section of a tire casing equipped with our mechanical inner tube, taken on the line D—D, Figure 1.

The mechanical inner tube is essentially composed of a plurality of convex reciprocating soles 5 and 6 disposed in radial relation so as to form a complete circle; the soles 6 forming the outer perimeter wall thereof, and the soles 5 forming the inner perimeter wall, the soles 5 being thicker in their middle part for obtaining more strength. At one end thereof is a bracket 10 with a flat post 18 disposed in the center part thereof. At its opposite end is a bracket 8 having two flatposts 15 disposed in pair relation thereof.

The sole 6 has a bracket 9 with a flat post 17 disposed in the center part thereof and reciprocating with the bracket 10. At its opposite end is the bracket 7 with two flat posts 16 disposed in pair relation thereof and reciprocating with the flatposts 15. In this arrangement, a single post bracket is always next in line with a double post bracket.

Figure 13:
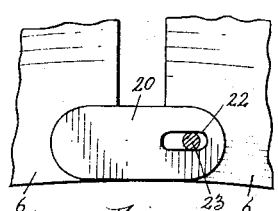
Figure 13 is a detail view showing how the multiple soles of the mechanical tube are joined together in a radial, articulated relation.
Figure 4:
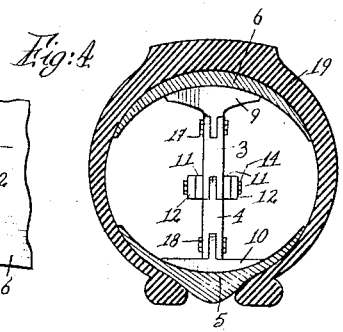
Figure 4 is a section of a tire casing equipped with our mechanical inner tube, taken on the line C—C, Figure 1.
Figure 5:
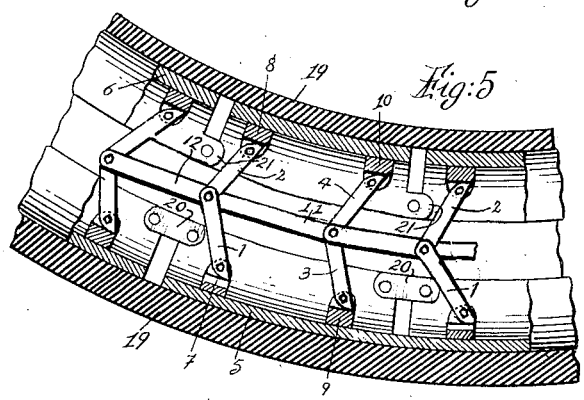
Figure 5 is a section similar to that illustrated in Figure 1, showing the organs of the mechanical inner tube in the deflated position.
Figure 14:
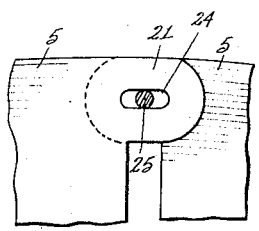
Figure 14 is a view similar to that illustrated in Figure 13.

The soles 5 and 6 are joined to one another, in radial relation, by means of tongues 20 and 21, one tongue overlapping the next sole in line. Suitable pins 23 and 25 engaging slot holes 22 and 24 provide a free articulating action. Figure 13 illustrates the arrangement whereby soles 6 are joined, and Figure 14 illustrates the arrangement pertaining to soles 5.

The soles 5 and 6 are opposed and they are conversely linked together by means of toggle bars: 1, 2, 3 and 4: the toggle bars 3 and 4 linking the single post brackets 9 and 10, and the toggle bars 1 and 2 linking the double post brackets 7 and 8, thus obtaining a continuity of toggle joints, or elbows, inside said inner tube and forcing apart the outer and the inner perimeter walls thereof.

The toggle bars aforesaid are actuated by means of an endless chain composed of the angular links 11 and 12; the long links 11 alternating with the short links 12. The toggle joints formed by the conjunction of the bars 1 and 2 are pivoted on the wider ends of the links 11 and 12, while the joints originating in the conjunction of the bars 3 and 4 are pivoted on the short ends of the links 11 and 12, thus obtaining a simultaneous dilatating action throughout the whole length of the tube.

From the foregoing description, it will be readily understood that the multiple action of the articulations will render the mechanical tube resilient throughout its entire length, while the knee action of the toggle bars 1, 2, 3 and 4 will insure a strong and uniform circular pressure similar to that obtained by compressed air on the inside wall of the casing 19.

Means have been provided for actuating the toggle joints for producing the circular inner pressure in the casing 19, and also for decreasing that pressure when necessary. This device is fully illustrated in Figure 6. It comprises a worm gear 28 having square thread and supported on two brackets 33. The worm gear 28 meshes in the teeth 27 cut along the lower edge of rocker arm 26 operating as one link of the said endless chain, each other link thereof being connected to one of the toggle joints aforesaid by means of suitable pins. Two tension springs 47 insure a perfect meshing, at all times of the thread 28 with the teeth 27.

The device may be operated either by hand or with pincers, the movement being transmitted to the worm gear 28 by means of a knob 37, a sleeve 36 with a cone pinion 32, a spur gear 30 with a miter gear 31 and a flanged pinion 29. Actuating the knob 37 will cause the worm gear 28 to rotate and shift the rocker arm 26, thus actuating the toggle bars 1, 2, 3 and 4.

Means of locking the device, when the desired pressure is obtained, have been provided. They comprise a bent shaft 39 engaging the cogs 41 cut in concentric relation with the teeth of the miter gear 31. The shaft 39 is maintained in position in the sleeve 36 by means of a bushing 48, and it may be actuated by the ring 38.

From the foregoing description, it may be easily understood that the various objectives of the invention are obtained, as substantially described, and that it is well adapted to the purposes for which it is intended.

While we have shown the preferred embodiment of our invention, it is to be understood that various changes in the size, shape and arrangement of parts may be resorted to, without departing from the spirit of the invention and the scope of the appended claims.

What we claim as our invention is:

1. A mechanical inner tube for use with a tire casing, said inner tube comprising a plurality of convex shoes arranged in radial and articulated relation so as to form a complete circular shoe, said individual shoes having brackets and flat posts and being joined together by means of tongues, one tongue overlapping the next shoe in line for obtaining a free articulating action in said circular shoe; the individual shoes forming the outer perimeter thereof and those forming the inside perimeter of the said circular shoe being linked together in reciprocal relation by a plurality of toggle bars forming a continuity of toggle joints and being pivoted in opposed relation so as to produce a toggle action simultaneously along the whole circumference of the said circular shoe, forcing apart the outer and the inner walls thereof for obtaining an even circular pressure against the inside wall of the said tire casing suitable to carry the weight of a motor vehicle and to insure good driving; an endless chain composed of short and long angular links arranged in alternating relation and pivoted on the said toggle joints; means of actuating the said toggle bars.

2. A mechanical inner tube, such as described in claim 1, the shoes forming the inner wall thereof being thicker in their middle part for obtaining more strength.

3. A mechanical inner tube, such as described in claim 2, the said shoes having two brackets disposed crosswise thereof and being surmounted by three flat posts: one bracket thereof having one flatpost, and the other, two flatposts, so that the said shoes may be arranged in alternating relation, one single post bracket being next to a double post bracket.

4. A mechanical inner tube, such as described in claim 3, the single flat posts thereof being pivoted on the narrow ends of the angular links of the said chain, and the double flatposts being pivoted on the wider ends thereof for obtaining an even circular pressure throughout the said casing.

5. A mechanical inner tube, such as described in claim 4 and having means of actuating simultaneously the said toggle joints, comprising a worm gear rotating on two brackets, a rocker arm with teeth along its lower edge for meshing the said worm gear, said rocker arm being inserted in the said chain and having its ends connected to the said toggle joints.

6. A mechanical inner tube, such as described in claim 5 and having a flanged pinion adjacent to the said worm gear, a spur gear with a miter gear commanding said flanged pinion, a cone pinion with sleeve for transmitting the movement to the said miter gear, and a knob for actuating the said sleeve.

7. A mechanical inner tube, such as described in claim 6 and having means of locking the expanding device, comprising a bent shaft engaging cogs cut in concentric relation with the teeth of the said miter gear, the said shaft being secured inside the said sleeve by means of a bushing, a ring at the end of the said shaft for actuating it.

LUCIEN LEPAGE.
JOSEPH A. DE CHAMPLAIN.

REFERENCES CITED

The following references are of record in the file of this patent:

UNITED STATES PATENTS

| Number | Name | Date |
|---|---|---|
| 1,272,602 | Barr | July 16, 1918 |
| 2,286,507 | Quinn | June 16, 1942 |